United States Patent Office 3,008,970
Patented Nov. 14, 1961

3,008,970
PROCESS FOR THE PREPARATION OF ISO-
CUMARIN CARBOXYLIC ACIDS AND THEIR
DERIVATIVES
Cornelis van der Stelt, Amsterdam, Netherlands, assignor to N.V. Koninklijke Pharmaceutische Fabrieken V/H Brocades-Stheeman & Pharmacia, Amsterdam, Netherlands, a corporation of the Netherlands
No Drawing. Filed Dec. 3, 1959, Ser. No. 856,929
Claims priority, application Netherlands Dec. 8, 1958
3 Claims. (Cl. 260—343.2)

Several methods for the preparation of isocoumarin carboxylic acid and its derivatives are already known.

Thus, according to J. Org. Chem. 13, 477 (1948) isocoumarin carboxylic acid itself can be obtained in a yield of 11.6% from β-naphthol via 1,2 naphthoquinone, while in the same place the preparation from phthalide by reaction with KCN, saponification, condensation with dimethyl oxalate, followed by a ring-closure, is described. This latter method gives a yield of about 10%, referred to the initial product.

From Ber. 64, 1931 (1931) a method for the preparation of the methyl ester of the 7,8-dimethoxy compound is known, by which the potassium salt of opianic acid is reacted with ethyl chloroacetate and ring-closure of the ester thus obtained is induced with the aid of sodium in xylene. The yield of this reaction cycle, however, is very small.

Now it was found that isocoumarin carboxylic acids which may be substituted in the carbocyclic ring and have the formula

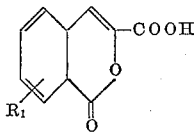

in which $R_1$ may stand for one or more alkoxy groups, can be prepared in a considerably higher yield by starting from the appropriate substituted phthalaldehydic acids

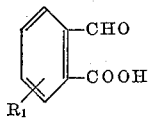

converting the latter into the azlactone compound

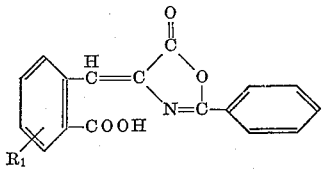

and saponifying the azlactone compound in a strongly alkaline medium.

Contrary to the normal course of affairs, the resulting products are not the phenylpyruvic acids to be expected, but the corresponding unsaturated lactones are formed directly.

The preparation of the azlactone compounds, which usually takes place, according to Ann. 337 (1904) 294, by reacting the desired aromatic aldehyde with hippuric acid and acetic anhydride in the presence of sodium actate, can also be carried out, according to Chem. of Penicillin 171 (1949) Princeton Univ. Press, by first preparing 2-phenyloxazolone-5 from acetic anhydride and hippuric acid and then reacting this compound with the aldehyde. It has been found that, when an azlactone of an o-phthalaldehydic acid is to be prepared, only the latter method results in the desired product. Preferably an alkali salt of o-phthalaldehydic acid is used for this synthesis. The isocoumarin carboxylic acids thus obtained and their derivatives form part of a class of compounds several representatives of which have valuable pharmacological properties, while they may be used also as intermediates for the preparation of compounds exhibiting a yohimbine-like structure.

The invention may be illustrated by means of the following examples.

EXAMPLE I (a) *Preparation of 2-phenyloxazolone-5*

In 120 ml. of boiling acetic anhydride 40 g. of finely powdered hippuric acid is dissolved with stirring. The excess of acetic anhydride is subsequently distilled off under reduced pressure.

To the remaining red syrup 80 ml. of petroleum ether (B.P. 60–80° C.) is added, whereupon the crude phenyloxazolone crystallizes. It is filtered, washed with 40 ml. of petroleum ether, and crystallized from 30 ml. of absolute ethanol. The yield consists of 16–18 g. of a substance with melting point 90–91° C.

(b) *Preparation of 4-(3',4'-dimethoxy 2'-carboxybenzylidene) 2-phenyloxazolone-5*

To a solution of 5.6 g. of KOH in 200 ml. of absolute ethanol 21 g. (0.1 mole) of opianic acid is added. After cooling to about 10° C., 16.5 g. of 2-phenyloxazolone-5 is added in one portion. A dark red solution is formed, from which after some time the potassium salt of the azlactone begins to precipitate. After 10 minutes' standing at room temperature, the solution is acidified with 30 ml. of 4 n $H_2SO_4$ to a weakly acid reaction. First everything goes into solution; after this the azlactone precipitates in yellow needles. After cooling to 0° C., the substance is filtered and crystallized from absolute ethanol. Yield 14.6 g.=42.8%.

The compound melts at 165–167° C. solidifies again upon continued heating, after which it chars at about 230° C. without melting again.

Found: C=64.34, H=4.56, N=4.08
Calculated for $C_{19}H_{15}O_6N$: C=64.58, H=4.22, N=3.99

(c) *7,8-dimethoxy 3-carboxy isocoumarin*

12 g. of 4(3',4'-dimethoxy 2'-carboxybenzylidene) 2-phenyloxazolone-5 is saponified by refluxing for 2 hours in 120 ml. of water and 24 g. of NaOH, as a result of which ammonia is liberated. The reaction mixture is cooled, acidified with conc. HCl to Congo red, refluxed again for half an hour, and then cooled to 0° C., as a result of which a mixture of 7,8-dimethoxy 3-carboxy-isocoumarin and benzoic acid precipitates. This mixture is filtered by suction and crystallized from ethanol. The yield is 7.0 g.=80.8% of the desired compound, which crystallizes in pale yellow needles with a melting point of 263–265° C.

The total yield from opianic acid (34.2%) can be increased even further by directly saponifying the unpurified azlactone.

Found: C=57.80, H=4.19
Calculated for $C_{12}H_{10}O_6$: C=57.60, H=4.00

The methyl ester, prepared from the acid by boiling with methanol and dry HCl, has a melting point of 172–174° C.

EXAMPLE II (a) *Preparation of 4-(2'-carboxybenzylidene)2-phenyloxazolone-5*

To a solution of 5.6 g. of KOH in 200 ml. of absolute ethanol 15 g. (0.1 mole) of o-phthalaldehydic acid is added. After cooling to about 10° C., 16.5 g. of 2-phenyloxazolone-5 is added in one portion. From the red solution the potassium salt of the azlactone precipitates directly.

After 10 minutes' standing at room temperature, the solution is acidified with 30 ml. of 4 n $H_2SO_4$. In this way the azlactone is obtained in microcrystalline condition. After cooling to 0° C., the solution is filtered by suction; the pale yellow substance that is left behind is air-dried. Yield 22.0 g.=75%.

The azlactone can be purified by repeated crystallization from absolute methanol. Heating gives rise at about 230° C. to discoloration and finally to charring.

Found: C=69.59, H=3.87, N=4.82
Calculated for $C_{17}H_{11}O_4N$: C=69.62, H=3.78, N=4.78

(b) *Preparation of 3-carboxy isocoumarin*

22.0 g. of 4-(2'-carboxybenzylidene) 2-phenyloxazolone-5 is saponified by refluxing for 40 minutes in 200 ml. of water and 40 g. of NaOH. After acidification with concentrated hydrochloric acid to Congo red, the mixture is refluxed again for half an hour, whereupon it is cooled to 0° C. The mixture of 3-carboxy isocoumarin and benzoic acid is filtered by suction and stirred with 30 ml. of methanol, whereupon the greater part of the benzoic acid goes into solution. The isocoumarin carboxylic acid is filtered by suction and crystallized from methanol.

Yield 6.35 g.=33.4%, calculated on o-phthalaldehydic acid.

Melting point 240–242° C.
Found: C=63.08, H=3.00
Calculated for $C_{10}H_6O_4$: C=63.16, H=3.16

What I claim is:
1. Process for the preparation of isocumarin carboxylic acids having the formula

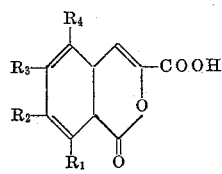

wherein $R_1$, $R_2$, $R_3$ and $R_4$ each is a representative of the class consisting of hydrogen and alkoxy groups, which comprises condensing in an alcoholic solution a phthalaldehydic acid of the formula

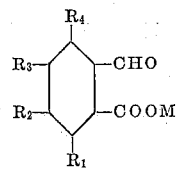

wherein M is a representative of the class consisting of hydrogen and monovalent metal atoms with an oxazolone-5 having the formula

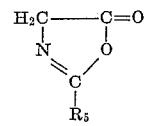

wherein $R_5$ represents a hydrocarbon radical into a compound of the formula

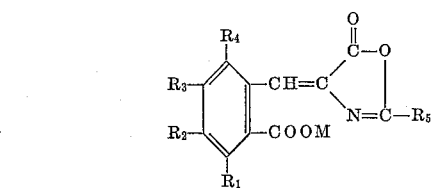

which thereafter is saponified by refluxing in a strongly alkaline solution.

2. Process as claimed in claim 1, wherein the oxazolone-5 used is 2-phenyl oxazolone-5.

3. Process as claimed in claim 1, wherein the phthalaldehydic acid is used in the form of an alkali salt.

No references cited.